United States Patent [19]

Wellman

[11] Patent Number: 4,843,804
[45] Date of Patent: Jul. 4, 1989

[54] ARRANGEMENT USING MOWER-CONDITIONER HEADER FLOAT SPRINGS TO BIAS CONDITIONER ROLL

[75] Inventor: Stanley P. Wellman, Ottumwa, Iowa

[73] Assignee: Deere & Company, Moline, Ill.

[21] Appl. No.: 238,227

[22] Filed: Aug. 30, 1988

[51] Int. Cl.⁴ .................. A01D 43/10; A01D 47/00
[52] U.S. Cl. .......................... 56/16.4; 56/1; 56/15.8; 56/DIG. 1
[58] Field of Search .............. 56/1, DIG. 1, 14.9, 56/14.4, 14.5, 15.8, 16.4

[56] References Cited

U.S. PATENT DOCUMENTS

| | | | |
|---|---|---|---|
| 3,363,407 | 1/1968 | Drummond | 56/14.4 X |
| 3,599,405 | 8/1971 | Hurlburt et al. | 56/DIG. 1 X |
| 3,672,132 | 6/1972 | Scarnato et al. | 56/1 |
| 3,958,399 | 5/1976 | Schoeneberger | 56/14.4 X |
| 4,175,366 | 11/1979 | Cicci | 56/DIG. 1 X |
| 4,472,927 | 9/1984 | Vogt et al. | 56/DIG. 1 X |
| 4,546,599 | 10/1985 | Cicci et al. | 56/DIG. 1 X |

Primary Examiner—Hoang C. Dang

[57] ABSTRACT

A pull-type mower-conditioner has a main frame including a pair of laterally spaced, downwardly projecting legs. A lower conditioner roll has opposite ends rotatably mounted to the main frame while an upper conditioner roll is mounted for arcuate movement towards and away from the lower roll by means of a pair of laterally spaced, L-shaped roll support arms that are respectively vertically pivotally mounted to the pair of main frame legs and have forwardly projecting legs in which opposite ends of the upper roll are rotatably mounted. A header is suspended from the main frame for vertical floating movement by a pair of four-bar linkages respectively coupled to opposite ends of the header and coupled directly between upstanding legs of each of the roll support arms and a bottom link of each of the four-bar linkages is a float spring that acts to simultaneously exert a lifting force on the header and a downwardly biasing force on the upper conditioner roll.

14 Claims, 2 Drawing Sheets

ARRANGEMENT USING MOWER-CONDITIONER HEADER FLOAT SPRINGS TO BIAS CONDITIONER ROLL

BACKGROUND OF THE INVENTION

The present invention relates to crop harvesting and conditioning machines, such as mower-conditioners, of a type including a vertically floatable header located for delivering crop to the nip of upper and lower conditioner rolls and including header float or counterbalance springs which also act to resist vertical pivotal movement of the upper conditioner roll away from the lower conditioner roll.

The idea of using header float springs to bias an upper conditioner roll toward a lower conditioner roll is known. However, the structures heretofore used for accomplishng such a dual function for float springs suffer from the disadvantage that the biasing force exerted on the upper conditioner roll diminishes as the header is raised and might result in crop being conditioned to a lesser degree than is desired, as when the header is raised for turning at the end of a field, for example. Further, these known structures lack simplicity in that they use a bell crank and link series connected between each float spring and an arm vertically pivotally supporting the upper conditioner roll. Examples of these known structures are disclosed in each of U.S. Pat. No. 3,474,601 issued Oct. 28, 1969 and U.S. Pat. No. 3,797,207 issued Mar. 19, 1974.

OBJECTS AND SUMMARY OF THE INVENTION

Accordingly, a primary object of the present invention is to provide a mower-conditioner having an improved header float spring arrangement whereby the float springs act to provide a substantially constant conditioner roll bias throughout all working heights of the header.

A further object of the invention is to provide a header float spring arrangement featuring a simplified connection between the float springs and arms vertically swingably supporting the upper conditioner roll.

It is another object of the invention to provide a header float spring arrangement including a simple lost-motion connection between the wheel support and upper conditioner roll support arms for automatically opening and conditioner rolls once the header is raised beyond a normal working range.

Still another object of the invention is to provide a header float spring arrangement which includes an adjustable down-stop connection between the frame and upper conditioner roll support arm.

To accomplish these and other objects, the crop harvesting machine of the invention includes a header coupled for vertical floating movement by upper and lower sets of linkages, the upper set being connected between the header and machine main frame and the lower set being coupled between the header and wheel support arms that are vertically swingably mounted to the main frame and hydraulically swingable to move the header through a range of working positions and to raised transport position. Float or counterbalance springs are connected directly between the lower set of mounting linkages and upwardly projecting legs of a pair of L-shaped upper conditioner roll support arms that are vertically pivotally mounted to the main frame and includes forwardly projecting legs rotatably supporting opposte ends of the upper conditioner roll, the springs acting to create a force urging the upper conditioner roll toward a lower conditioner roll carried by the main frame and at the same time lifting the header.

Brackets are fixed to and project rearwardly from the upwardly projecting legs of the upper conditioner roll support arms and connected between each bracket and a respective one of the wheel support arms is a chain which serves as a lost-motion connection that acts to open the conditioner rolls only when the wheels are swung to elevate the header to its transport position. Additional tension springs can be connected between the frame and the brackets to increase the roll pressure.

A pair of links each embodying a threaded rod are respectively coupled between the upper conditioner roll support arms and the main frame and define down stops for establishing a preselected gap between the conditioner rolls when the latter are in their operating positions.

DESCRIPTION OF THE PREFERRED EMBODIMENT

Figure 1:
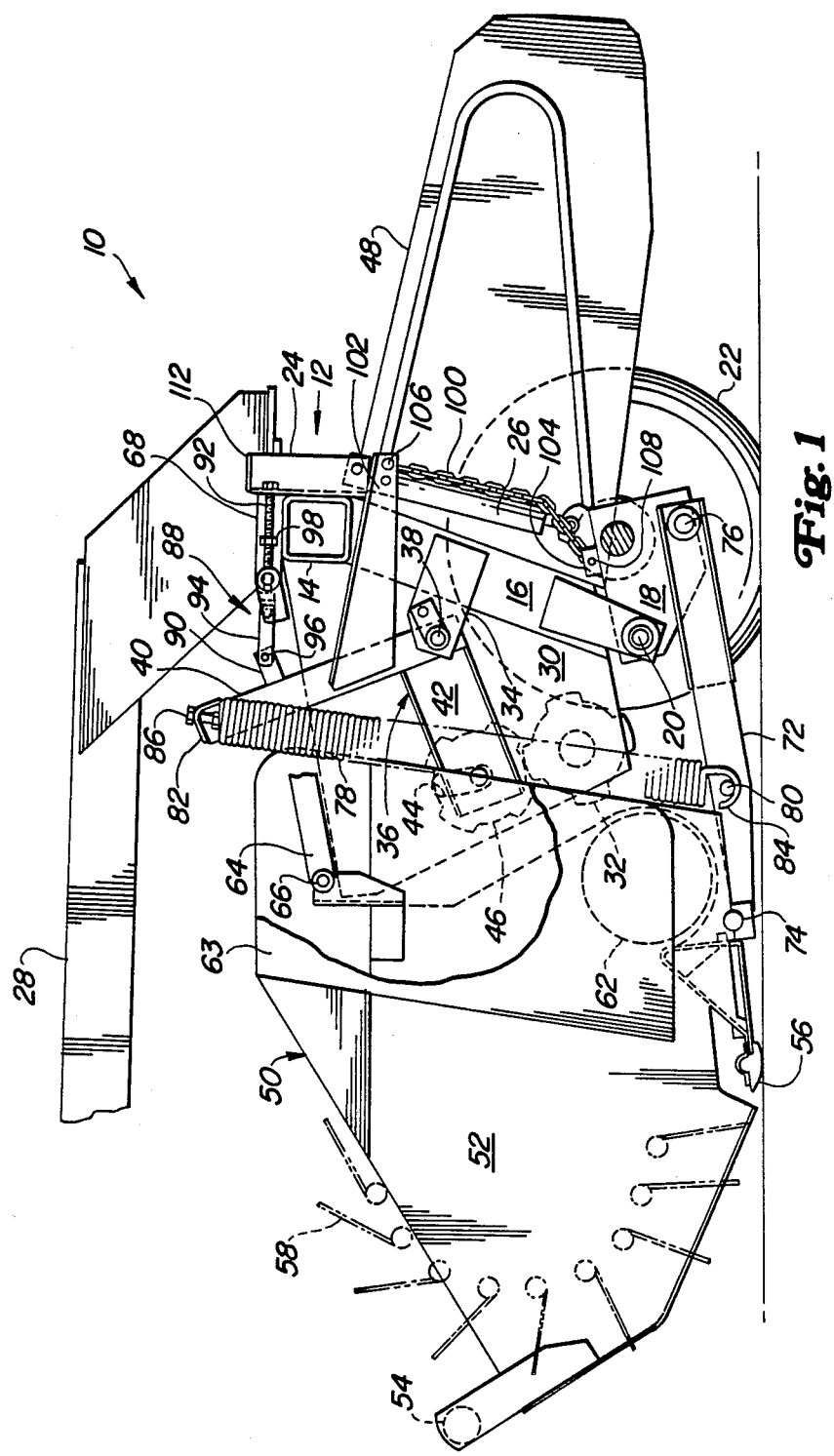
FIG. 1 is a left side elevational view of a combined crop harvesting machine and conditioner embodying the float spring arrangement of the present invention and showing the machine in a lowered working position.

The description which follows mentions various components as being in pairs while only the components at the left side of the machine are illustrated. It is to be understood that the unshown component is either identical to or the mirror image of the one shown.

Referring now to the drawings, there is shown a pull-type crop harvesting machine 10 commonly referred to as a mower-conditioner. The machine 10 includes a main support frame 12 including a transverse cross beam 14 having downwardly extending legs 16 joined thereto adjacent its opposite ends. Each leg 16 has a wheel-support arm 18 vertically pivotally mounted to its lower end by a pivot 20 and rotatably mounted to each arm 18 is a wheel 22. A U-shaped rearwardly opening cylinder mounting bracket 24 is welded to the back side of the beam 14 in fore-and-aft alignment with each of the legs 16. Coupled between the bracket 24 and wheel-support arm 18 at each side of the machine is an extensible and retractable hydraulic actuator 26, the actuators 26 being selectively operable for adjusting the vertical position of the wheels relative to the main frame 12. A draft tongue 28 has its distal end horizontally pivotally connected to an upper central location of the beam 14 in a well-known manner, not shown. An extensible and retractable hydraulic actuator, also not shown would normally be connected between the tongue 28 and frame 12 for adjusting the angular position of the draft tongue relative to the beam for adjusting the path of travel of the machine 10 relative to a towing tractor (not shown) hitched to a forward end of the draft tongue.

Fixed to the main frame 12 in the vicinity of each of the frame legs 16 is a fore-and-aft extending side sheet 30. A lower conditioner roll 32 extends between and is rotatably mounted to lower forward locations of the side sheets 30. A forwardly projecting bracket 34 is fixed to a mid-height location of each of the legs 16 and an L-shaped conditioner roll support arm 36 is vertically pivotally mounted to each bracket 34 by a pivot 38 extending through the arm 36 at the juncture of an upstanding leg 40 and a forwardly extending leg 42. An arcuate slot 44 is formed in each side sheet 30 on a radius about a first horizontal pivot axis defined by the pivots 38 and received through the slots 44 and rotatably mounted in the forward ends of the legs 42 are opposite ends of an upper conditioner roll 46. Thus, the upper conditioner roll 46 is mounted for movement toward and away from the lower conditioner roll 32. Located for forming a windrow of material discharged from the conditioner rolls 32 and 46 is a shield structure 48 which is joined to and extends rearwardly from the frame 12.

A header 50 is mounted in front of the conditioner rolls for cutting a crop and delivering it to the rolls to be conditioned. Specifically, the header 50 includes transversely spaced, fore-and-aft extending side panels 52 connected together at their forward ends by a transverse knockdown bar 54. An elongated transverse cutter bar 56 extends between and is supported by lower edges of the panels 52. A reel 58 is rotatably supported by the panels 52 forwardly of the cutter bar 56 so that crop engaging elements thereof sweep adjacent the cutter bar 56 and deliver crop to a cross auger 62, also having opposite ends rotatably carried by the side panels 52. The auger 62 operates to deliver the cut crop into a nip area of the conditioner rolls 32 and 46. The cutter bar, reel, auger and conditioner rolls are all driven in a conventional manner (not shown), a portion of the drive for some of these elements being located within housing 63 which extend outwardly from the side panels 52.

The header 50 is suspended for vertical floating movement by a linkage including either a pair of upper links 64 with one being provided at each side of the header or a single centrally located upper link. Each upper link 64 has its forward end coupled to an upper rear location of the adjacent side panel 52 by a pivot 66 and has its rearward end coupled to a cross beam borne bracket 68 by a pivot 70. Disposed in general parallel relationship to each upper link 64 is a lower link 72 having its forward end coupled to the lower edge of the side panel 52 by a pivot 74 located below a forward portion of the auger 62 and having its rearward end coupled to the adjacent wheel support arm 18 by a pivot 76.

A coil extension spring 78 is connected between the conditioner roll support art 36 and lower link 72 at each side of the machine 10 for simultaneously biased the upper conditioner roll 46 toward the lower coditiner roll 32 toward a normal closed position (FIG. 1) and exerting a lifting force on the header 50. Specifically, joined to and projecting outwardly from each of the links 72 at a location approximately one-third of the length of the link from its forward end is a peg 80. Joined to and projecting outwardly from the top of the upwardly extending leg 40 of each support arm 36 is a flange 82. The springs 78 each have a lower end defined by a hook 84 engaged with an adjacent one of the pegs 80 and have a threaded plug (not visible) carried at its upper end and receiving a threaded adjustment bolt 86 extending through an adjacent one of the flanges 82. It can be seen then, as viewed in the drawing, the springs 78 bias the arms 36 counterclockwise about the pivots 38 and, hence, bias the upper roll 46 towards the lower roll 32. A desired minimum spacing between the upper and lower conditioner rolls is maintained by an adjustable down stop 88 coupled between the arm 36 and the cylinder mounting bracket 24 at each side of the machine 10. Speicifically, the upwardly extending leg 40 of each arm 36 is provided with a rearwardly projecting tab 90 disposed in fore-and-aft alignment with an upper end of an adjacent one of the brackets 24. As can best be seen in FIG. 1, the down stop 88 is defined by an adjustment bolt 92 and a clevis 94, the bolt being reciprocably received in the bracket and adjustably threaded into a hole provided in the closed end of the clevis. The clevis 94 has its legs connected to the tab 90 by a pin 96. A stop nut 98 is provided on a rearward part of the bolt threads so as to prevent the latter from being damaged by slipping back and forth through the bracket 24.

Figure 2:
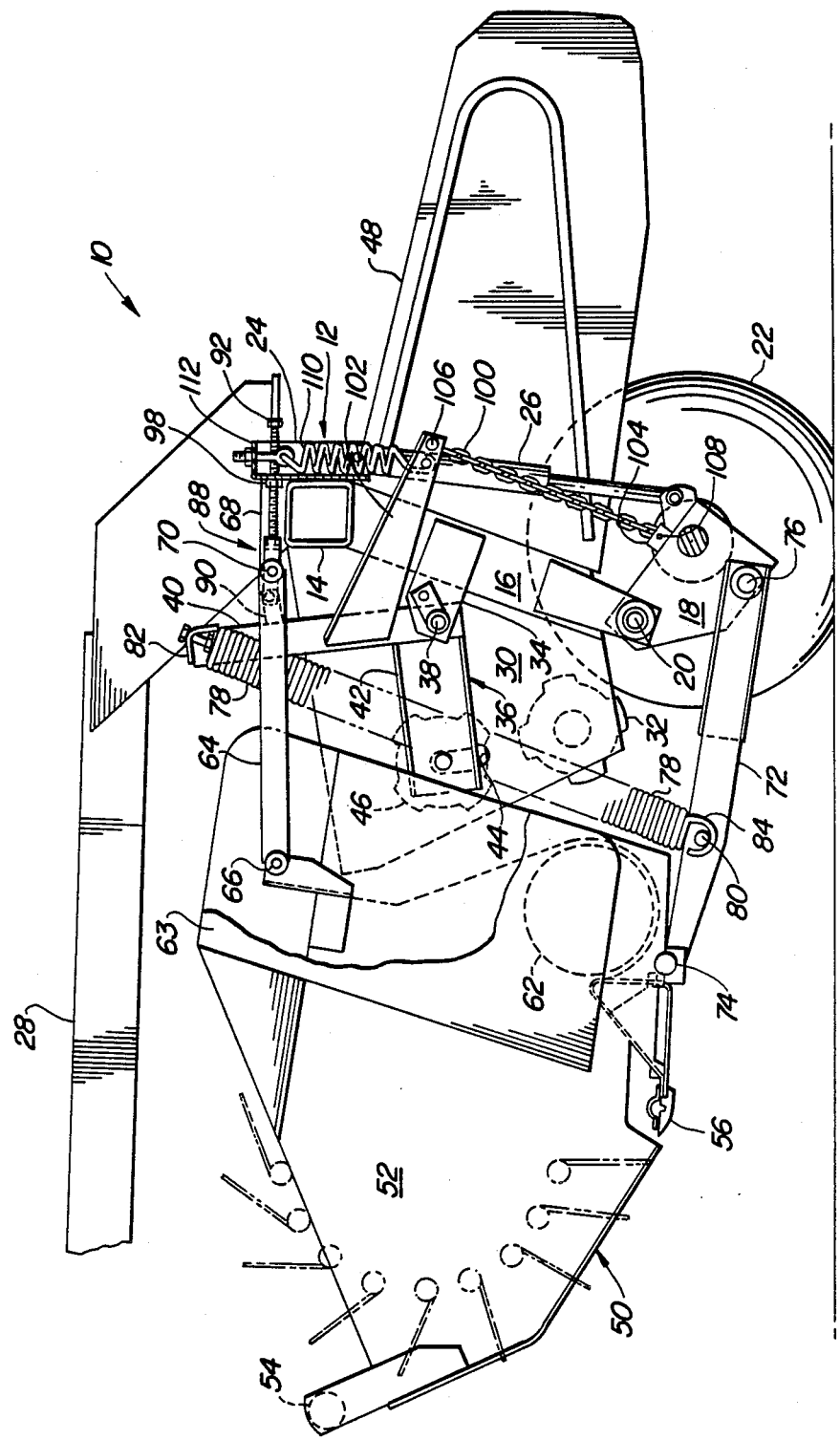
FIG. 2 is a view like FIG. 1 but showing the machine in a raised transport position.

When cutting in adverse conditions, the machine 10 may plug due to a build-up of material in front of the conditioner rolls 32 and 46. Provided for automatically effecting opening of the gap between the conditioner rolls, in response to the header being raised to its transport position (FIG. 2) by extension of the hydraulic actuators 26, for permitting the passage of built-up crop, is a flexible, lost-motion connection linkage, here shown as a chain 100 coupled between the wheel support arm 18 and roll support arm 36 at each side of the machine. A cable could be used instead of the chain. Specifically, an elongate bracket 102 is secured to and projects rearwardly from the upstanding leg 40 of each arm 36 to a location rearwardly of the arms 18 whih are each provided with a connection tab 104. The opposite ends of the chain 100 are respectively couped to the distal end of the bracket 102 and the tab 104 by bolts 106 and 108. Because it is desired that the conditioner rolls be closed over a range of header working heights so as to properly conditioner crop fed thereto, the length of the chains 100 is chosen so that the chains remain slack until the header 10 has been raised to within about 50 mm. of its transport position shown in FIG. 2. The tightened chains 100 then act during this last 50 mm. of lift of the header 10 to rotate the roll support arms 36 clockwise and open the gap between the rolls 32 and 46 from a normal operating gap of, for example, about 1.5 mm to a maximum gap of about 87 mm. Further contributing to the rolls 32 and 46 operting to properly condition crop over the working range of the header 50 is the geometrical relationship between the roll support arms 36, wheel support arms 18 and float springs 78 which results in the springs 78 exerting a substantially constant closing force on the conditioner roll 46 throughout the majority of the working height range of the header 50. It is here noted an additional biasing force operating solely for urging the upper roll 46 toward the lower roll 32, may be provided by optionally mounting a tension spring 110, at each side of the vehicle, between a respective horizontal flange 112 fixed to the top of each cylinder mounting bracket 24 and a respective one of the conditioner roll arm brackets 94, optional springs 110 being shown only in FIG. 2.

The operation of the harvesting machine 10 follows. Assuming the machine 10 to be located in a field from which it is desired to harvest a crop, the header 50 and hence the cutter bar 56 will be lowered to a desired cutting height by effecting retraction of the hydraulic actuators 26 to raise the wheel support arms 18 ad attached wheels 22 relative to the frame 12. At the same time, the chains 100 will go slack and the conditioner roll support arm 36 will be pivoted counterclockwise by the force of the float springs 78 until it is stopped by the adjustable down stop 88. The upper conditioner roll 46 will then be yieldably biased toward the lower conditioner roll but stopped short of contacting the latter so that a preselected gap, which may for example be in the neighborhood of 1.5 mm., exists therebetween when no crop material is passing between the rolls. The derives for the various driven components of the machine 10 are then engaged and the machine towed across the field for harvesting the crop.

As the machine 10 advances across the field, the cutter bar 56 will sever the crop which is then swept into the auger 62 by the reel 58, the auger acting to feed the crop into the gap or nip of the rolls 32 and 46 which condition the crop and expel it rearwardly to be formed into windrows by the shield structure 48. During such operation, the float springs 78 will be exerting a lifting force on the header 50 so that the latter may easily follow the terrain. The springs 78 will also be functioning to keep the auger conditioner roll 46 in biased yieldable engagement with a mat of crop material passing between the rolls.

In the event that a slug of crop material should arrive at the conditioner rolls and plug the machine, the operator will stop the machine and raise it to its transport position by effecting extension of the hydraulic actuators 26. As the header 50 approaches within about 50 mm. of its transport position, the chains 100 will tighten and effect clockwise movement of the roll support arm 36 so as to widen the gap between the rolls 32 and 46 to about 87 mm. so as to permit the slug of crop material to pass therebetween. Once the machine is cleaned, the actuators 26 are once again retracted to position the header 50 in its operating position. The gap between the rolls 32 and 46 may be adjusted to produce a desired amount of conditioning, so as to accommodate for varying crop conditions or crops, by adjusting the down stop 88; and, for the same purpose, more or less biasing force may respectively be applied to or removed from the roll support arm 36 by adding or subtracting the optional tension springs 110. Of course, changes in both the float and biasing force exerted on the roll support arms can be made by turning the adjustment bolts 86 in the appropriate directions for increasing or decreasing the force exerted by the float springs 78.

I claim:

1. A crop harvesting machine comprising: a main frame having a transverse frame portion; a pair of transversely spaced wheel support arms vertically pivotally mounted to the transverse frame portion for swinging about a horizontal transverse axis; a pair of support wheels respectively rotatably mounted to the pair of wheel support arms; a pair of extensible and retractable hydraulic actuators respectively connected between the pair of wheel support arms and the transverse frame portion; a crop harvesting header located forwardly of the pair of wheels and being coupled to the transverse frame portion by at least one upper link and respectively coupled to the pair of wheel support arms by a pair of lower links, said header being movable between lowered working positions and a raised transport position by actuating the actuators to effect vertical movement of the wheel support arms; an upper and a lower conditioner roll located for receving crop from the header from opposite ends of the lower roll being rotatably carried by the main frame; a pair of parallel, transversely spaced, L-shaped roll support arms vertically pivotally mounted to the main frame and including respective forwardly projecting legs and upstanding leg; said upper conditioner roll having opposite ends rotatably mounted to forward ends of the forwardly projecting legs and being arcuately movable towards and away from the lower roll upon the roll support arms being pivoted vertically; and a pair of float springs respectively having first ends connected to the pair of lower links and having second ends respectively connected to the respective upstanding legs of the pair of conditioner roll support arms whereby the float springs act to simultaneously exert a lifting force on the header and a force biasing the upper conditioner roll toward the lower conditioner roll.

2. The crop harvesting machine defined in claim 1 and further including an adjustable down stop coupled between each roll support arm and the main frame for stopping the upper conditioner roll at a preselected distance from the lower conditioner roll whereby a minimum operating gap is established between the conditioner rolls.

3. The crops harvesting machine defined in claim 1 or 2 and further including a lost-motion linkage means connected between each roll support arm and an adjacent one of the wheel support arms for transmitting movement of the wheel support arm to the roll support arm to effect movement of the upper conditioner roll away from the lower conditioner roll only upon the wheel support arms being swung to raise the header adjacent its transport position.

4. The crop harvesting machine defined in claim 3 wherein each lost-motion linkage means is defined by an elongate flexible element.

5. The crop harvesting machine defined in claim 3 wherein each roll support arm has a rearwardly projecting bracket fixed to the upstanding leg thereof and each lost-motion linkage means having an upper end coupled to a respective rearwardly projecting bracket.

6. The crop harvesting machine defined in claim 1 or 2 wherein the geometrical relationship between the pair of float springs, the pair of lower links and the pair of roll support arms is such that the force biasing the upper conditioner roll toward the lower conditioner roll remains substantially constant over the working positions of the header.

7. The crop harvesting machine defined in claim 1 and further including a pair of optional biasing means respectively having a lower end coupled to the pair of roll support arms and respectively having an upper end coupled to the main frame.

8. A crop harvesting machine comprising: a wheel-supported main frame; a crop harvesting header located forwardly of and being vertically swingably coupled to the main frame by at least one upper link and by a pair of transversely spaced lower linkages; power lift means coupled between the main frame and the lower linkages for selectively moving the header between a range of lowered working positions and a raised transport position; an upper and lower conditioner roll extending horizontally and being disposed for receiving crop from the header with opposite ends of the lower roll being rotatably carried by the main frame; a pair of parallel, transversely spaced roll support arms being vertically swingably mounted to the main frame for movement about a horizontal, transverse axis; said upper conditioner roll having opposite ends rotatably mounted in the support arms and being arcuately movable away from and towards the lower roll upon the roll support arms being pivoted up and down; and a pair of float springs respectively having first ends connected to the pair of lower linkages and having second ends respectively coupled to the pair of roll support arms whreby the float springs act to simultaneously exert a lifting force on the header and a force biasing the upper conditioner roll toward the lower conditioner roll.

9. The crop harvesting machine defined in claim 8 and further including an adjustable down stop coupled between each roll support arm and the main frame for stopping the upper conditioner roll at a preselected minimum distance from the lower conditioner roll.

10. The crop harvesting machine defined in claim 8 or 9 and further including a lost-motion linkage means coupled between each roll support arm and an adjacent one of the pair of lower linkages for transmitting movement of the lower linkages to the roll support arms for effecting movement of the upper conditioner roll away from the lower conditioner roll only after the header is raised beyond its range of lower workiing positions.

11. The crop harvesting machine defined in claim 10 wherein each lost-motion linkage means is defined by a substantially inextensible flexible element.

12. The crop harvesting machine defined in claim 8 or 9 wherein the geometrical relationship between the pair of float springs, the pair of lower linkages and the pair of roll support arms is such that the force biasing the upper conditioner roll toward the lower conditioner roll remains substantially constant over the range of lowered working positions of the header.

13. The crop harvesting machine defined in claim 8 wherein said pair of lower linkages means each include a wheel support arm vertically pivotally connected to the main frame and having a wheel rotatably mounted thereto and a lower link having opposite ends respectively pivotally connected to the header and to the wheel support arm.

14. The crop harvesting machine defined in claim 13 wherein the power lift means is coupled to the wheel support arms and the pair of float springs are respectively coupled to the lower links.

* * * * *